UNITED STATES PATENT OFFICE.

JOHN WESLEY GRAY, OF RICEVILLE, PENNSYLVANIA.

IMPROVEMENT IN MEDICAL COMPOUNDS.

Specification forming part of Letters Patent No. 130,368, dated August 13, 1872.

*To all whom it may concern:*

Be it known that I, JOHN W. GRAY, of Riceville, in the county of Crawford, State of Pennsylvania, have invented a new and Improved Medical Compound for the Cure of the Asthma; and I hereby declare the following to be a full and exact description of the same.

To compound my cure for asthma I use the following ingredients, compounded in the following manner, viz.: Elecampane root, (*inula helenium*,) pulverized, one-half pound; flour of sulphur, three-fourths of a pound; wild turnip, two ounces; lobelia, one ounce. The ingredients to be all well pulverized and mixed to the consistency of batter with honey or refined sugar and water, to be administered in doses of one tea-spoonfull from two to three times per day.

What I claim as my invention, and desire to secure by Letters Patent, is as follows, to wit:

I claim the manufacture or preparation of a compound which is denominated medical compound for the cure of the asthma and heaves, composed of the ingredients set forth, combined in the aforesaid proportions, for the purposes herein set forth.

J. W. GRAY.

Witnesses:
  A. B. RICHMOND,
  ROE REISINGER.